(12) United States Patent
Cheng et al.

(10) Patent No.: US 10,970,617 B2
(45) Date of Patent: Apr. 6, 2021

(54) DEEP CONVOLUTIONAL NEURAL NETWORK ACCELERATION AND COMPRESSION METHOD BASED ON PARAMETER QUANTIFICATION

(71) Applicant: INSTITUTE OF AUTOMATION, CHINESE ACADEMY OF SCIENCES, Beijing (CN)

(72) Inventors: Jian Cheng, Beijing (CN); Jiaxiang Wu, Beijing (CN); Cong Leng, Beijing (CN); Hanqing Lu, Beijing (CN)

(73) Assignee: INSTITUTE OF AUTOMATION CHINESE ACADEMY OF SCIENCES, Beijing (CN)

( * ) Notice: Subject to any disclaimer, the term of this patent is extended or adjusted under 35 U.S.C. 154(b) by 613 days.

(21) Appl. No.: 15/753,520

(22) PCT Filed: Aug. 21, 2015

(86) PCT No.: PCT/CN2015/087792
§ 371 (c)(1),
(2) Date: Feb. 19, 2018

(87) PCT Pub. No.: WO2017/031630
PCT Pub. Date: Mar. 2, 2017

(65) Prior Publication Data
US 2018/0247180 A1 Aug. 30, 2018

(51) Int. Cl.
*G06N 3/04* (2006.01)
*G06K 9/62* (2006.01)
(Continued)

(52) U.S. Cl.
CPC .............. *G06N 3/04* (2013.01); *G06F 17/16* (2013.01); *G06K 9/4628* (2013.01);
(Continued)

(58) Field of Classification Search
CPC ...... G06N 3/04; G06N 3/0454; G06K 9/6232; G06K 9/6243
See application file for complete search history.

(56) References Cited

U.S. PATENT DOCUMENTS

2009/0161912 A1 6/2009 Yatom et al.
2014/0099033 A1* 4/2014 Natarajan ............ G06K 9/6247
382/205
(Continued)

FOREIGN PATENT DOCUMENTS

| CN | 104077233 A | 10/2014 |
|---|---|---|
| CN | 105184362 A | 2/2015 |
| CN | 104573731 A | 4/2015 |

OTHER PUBLICATIONS

Gong, Yunchao, et al. "Compressing deep convolutional networks using vector quantization." arXiv preprint arXiv: 1412.6115 (2014). (Year: 2014).*

(Continued)

*Primary Examiner* — Hal Schnee
(74) *Attorney, Agent, or Firm* — Maier & Maier, PLLC

(57) ABSTRACT

An acceleration and compression method for a deep convolutional neural network based on quantization of a parameter provided by the present application comprises: quantizing the parameter of the deep convolutional neural network to obtain a plurality of subcode books and respective corresponding index values of the plurality of subcode books; acquiring an output feature map of the deep convolutional neural network according to the plurality of subcode books and respective corresponding index values of the plurality of subcode books. The present application may implement the acceleration and compression for a deep convolutional neural network.

2 Claims, 2 Drawing Sheets

(51) Int. Cl.
    *G06K 9/46*      (2006.01)
    *G06N 20/00*     (2019.01)
    *G06F 17/16*     (2006.01)
    *G06N 3/08*      (2006.01)

(52) U.S. Cl.
    CPC ......... *G06K 9/6243* (2013.01); *G06K 9/6274* (2013.01); *G06N 3/0454* (2013.01); *G06N 3/08* (2013.01); *G06N 20/00* (2019.01)

(56) References Cited

U.S. PATENT DOCUMENTS

2015/0371359 A1    12/2015  Wu et al.
2018/0247180 A1*    8/2018  Cheng ................. G06K 9/6243

OTHER PUBLICATIONS

Fahim, A. M., et al. "An efficient enhanced k-means clustering algorithm." Journal of Zhejiang University-Science A 7.10 (2006): 1626-1633. (Year: 2006).*

Truong, Khoan K., and Russell M. Mersereau. "Structural image codebooks and the self-organizing feature map algorithm." International Conference on Acoustics, Speech, and Signal Processing. IEEE, 1990. (Year: 1990).*

Chan, K. W., and K. L. Chan. "Multi-reference neighborhood search for vector quantization by neural network prediction and self-organized feature map." Proceedings of ICNN'95-International Conference on Neural Networks. vol. 4. IEEE, 1995. (Year: 1995).*

Chen, Wenlin, et al. "Compressing convolutional neural networks." arXiv preprint arXiv: 1506.04449 (2015). (Year: 2015).*

PCT/CN2015/087792 Search Report.

* cited by examiner

DEEP CONVOLUTIONAL NEURAL NETWORK ACCELERATION AND COMPRESSION METHOD BASED ON PARAMETER QUANTIFICATION

TECHNICAL FIELD

The present application relates to the technology of image processing, and more particularly, to an acceleration and compression method for a deep convolutional neural network based on quantization of a parameter.

BACKGROUND

In recent years, a huge breakthrough has been achieved for deep convolutional neural networks in variety of fields, such as computer vision, voice processing, machine learning, and so forth, which remarkably improves the performance of machine algorithms in a plurality of tasks, such as image classification, target detection, voice recognition, and so forth, and is widely applied in industries such as internet, video surveillance, etc.

A training process of a deep convolutional neural network is learning and adjusting network parameters based on a large-scale dataset which contains manually annotated information. In general, a high capacity, high complexity deep convolutional network may learn the network parameters more comprehensively, so as to achieve better performance metrics. However, with the increase of network layers and number of parameters, the operational overhead and storage overhead will both grow considerably, hence for the time being, the training and testing of a convolutional neural network may mostly be performed on a high-performance computing cluster only.

On the other hand, the technology of mobile internet has made an enormous progress in recent years, and has been applied more and more extensively in real life. In an application scenario of mobile internet, the operational ability and storage ability of a device used by a user, such as a cell phone or a tablet, are quite limited. Although a deep convolutional neural network may be trained on a computing cluster, in an application scenario of mobile platform, the testing process of a network model still needs to be performed on a mobile device, which poses two challenges: how to decrease the testing time for a convolutional neural network, and how to compress the storage overhead of a network model.

Direct to the problem of acceleration and compression for a convolutional neural network, a number of effective algorithms have been presented. These algorithms decompose a certain layer in the network into a combination of a number of layers with lower complexity, so as to achieve the goal of reducing the cost of operation or storage. However, these algorithms fail to take the acceleration and compression for a convolutional neural network into account as well, and only perform tests on a few layers of the network, the effect of acceleration and compression for the entire network model still needs further research.

SUMMARY

The acceleration and compression method for a deep convolutional neural network based on quantization of a parameter provided by the application may implement the acceleration and compression for the deep convolutional neural network.

According to one aspect of the application, an acceleration and compression method for a deep convolutional neural network based on quantization of a parameter is provided, comprising: quantizing the parameter of the deep convolutional neural network to obtain a plurality of subcode books and the respective corresponding index values of the plurality of subcode books; acquiring an output feature map of the deep convolutional neural network according to the plurality of subcode book and the respective corresponding index values of the plurality of subcode book.

The acceleration and compression method for the deep convolutional neural network based on quantization of the parameter provided by the embodiments of the application, a plurality of subcode books and the respective corresponding index values of the plurality of subcode books are obtained by quantizing the parameter of the deep convolutional neural network, the output feature map of the deep convolutional neural network is acquired according to the plurality of subcode books and the respective corresponding index values of the plurality of subcode books, so that the acceleration and compression for the deep convolutional neural network may be attained.

DESCRIPTION OF EMBODIMENTS

An acceleration and compression method for a deep convolutional neural network based on quantization of a parameter provided by the embodiments of the application is elaborated hereinafter in conjunction with the accompanying drawings.

Figure 1:
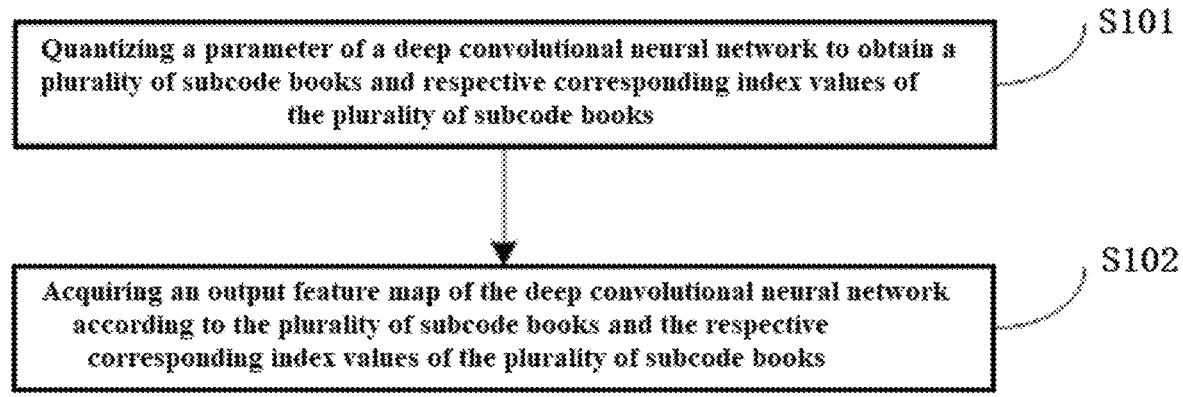
FIG. 1 is a flowchart of an acceleration and compression method for a deep convolutional neural network based on quantization of a parameter provided by an embodiment of the application.

FIG. 1 is a flowchart of an acceleration and compression method for a deep convolutional neural network based on quantization of a parameter provided by an embodiment of the application.

Referring to FIG. 1, in step S101, a parameter of the deep convolutional neural network are quantized to obtain a plurality of subcode books and respective corresponding index values of the plurality of subcode books.

In step S102, an output feature map of the deep convolutional neural network is acquired according to the plurality of subcode books and the respective corresponding index values of the plurality of subcode books.

Figure 2:
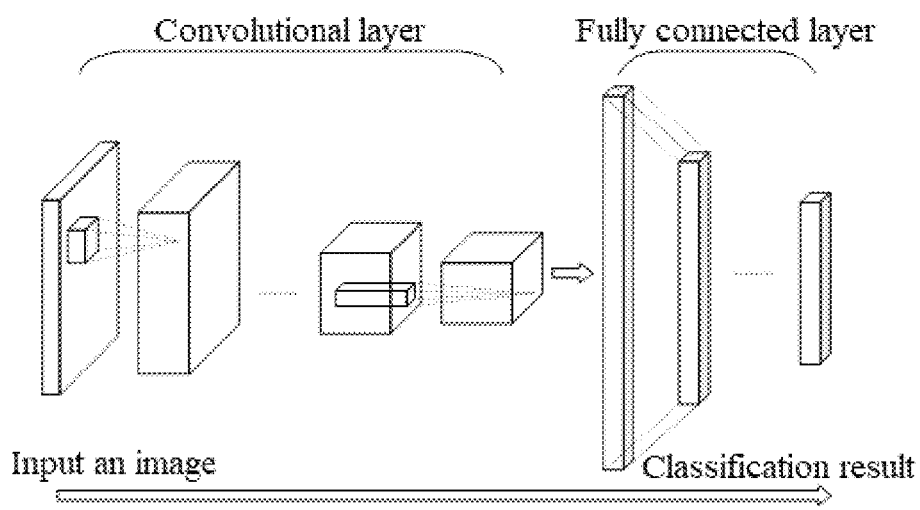
FIG. 2 is a schematic diagram of an image classification process of a deep convolutional neural network provided by an embodiment of the application.
Figure 3:
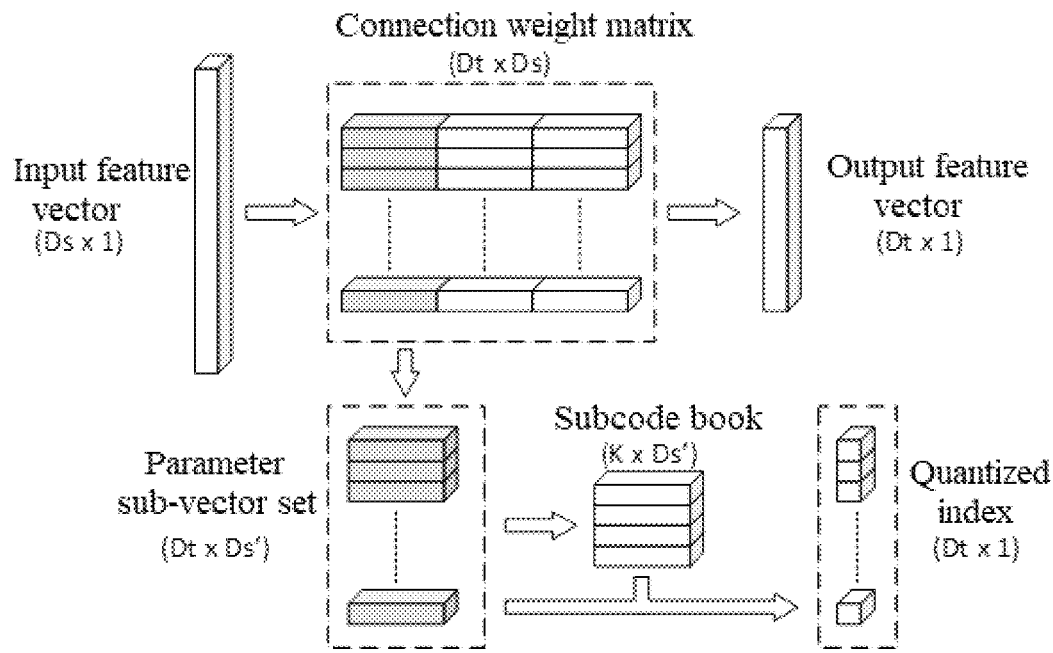
FIG. 3 is a schematic diagram of a parameter quantization process of a fully connected layer provided by an embodiment of the application.
Figure 4:
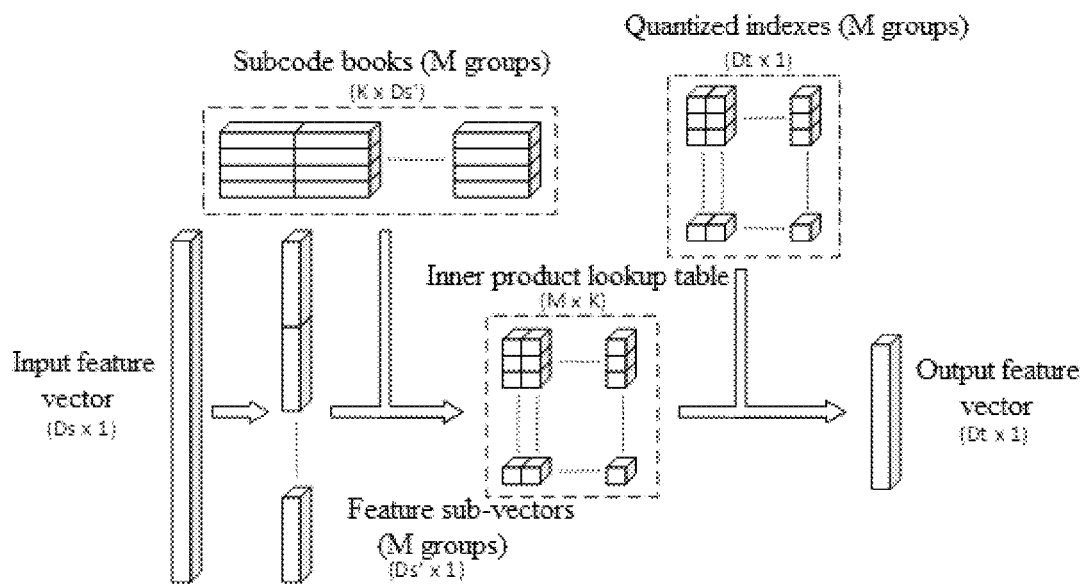
FIG. 4 is a schematic diagram of an effective operation process of a fully connected layer provided by an embodiment of the application.

Herein, the deep convolutional neural network comprises a plurality of convolutional layers or a plurality of fully connected layers, parameters of the plurality of convolutional layers or parameters of the plurality of fully connected layers are quantized, and the respective corresponding output feature map is obtained according to the quantized plurality of convolutional layers or the quantized plurality of fully connected layers, which is specifically referred to FIG. 2.

Further, the deep convolutional neural network is of a plurality of convolutional layers, the parameter of the deep convolutional neural network is quantized to obtain a plurality of subcode books and respective corresponding index values of the plurality of subcode books by executing the following processes until each of the plurality of convolutional layers has been traversed:

dividing a parameter of the convolutional layers into M groups, each group comprising a plurality of first parameter sub-vectors, where, M is a positive integer;

performing a K-means clustering for the plurality of the first parameter sub-vectors of each group to obtain a corresponding first subcode book of each group, the first subcode book comprising a plurality of first code words;

calculating a Euclidean distance between the plurality of the first parameter sub-vectors and the plurality of the first code words, respectively;

acquiring a first parameter sub-vector and a first code word with the minimum of the Euclidean distance, and recording an index value of the first code word with the minimum Euclidean distance.

Herein, the parameter of convolutional layers may be, but not limited to, in particular a 4-dimensional array of $W_k \times H_k \times C_s \times C_t$, where $W_k$ is a width of a convolution kernel, $H_k$ is a height of the convolution kernel, $C_s$ is a number of channels of an input first feature map, $C_t$ is a number of channels of an output first feature map. The dimension to which $C_s$ belongs is uniformly divided into M groups, the dimension of each group is $[C_s/M]$ (if the dimensions are insufficient, then a zero padding is performed in the last group), so the parameter of convolutional layers may be divided into M groups in this way, each group comprising $W_k \times H_k \times C_t$ first parameter sub-vectors.

A K-means clustering for $W_k \times H_k \times C_t$ first parameter sub-vectors of each group is performed to obtain a corresponding first subcode book of each group, where, K is a positive integer, and K is a number of first code words in a first subcode book.

Further, the deep convolutional neural network is of a plurality of fully connected layers, the parameter of a deep convolutional neural network is quantized to obtain a plurality of subcode book and respective corresponding index values of the plurality of subcode book by repeatedly executing the following processes until the plurality of fully connected layers have all been traversed:

dividing a parameter of the fully connected layers into M groups, each group comprising a plurality of second parameter sub-vectors;

performing a K-means clustering for the plurality of second parameter sub-vectors respectively to obtain a corresponding second subcode book of each of the groups, the second subcode book comprising a plurality of second code words;

calculating a Euclidean distance between the plurality of second parameter sub-vectors and the plurality of second code words, respectively;

acquiring a second parameter sub-vector and a second code word with the minimum of the Euclidean distance, and recording an index value of the second code word with the minimum Euclidean distance.

Herein, the parameter of the fully connected layers may be, but not limited to, in particular a $C_t \times C_s$ matrix, where $C_s$ is a number of nodes of an input layer, $C_t$ is a number of nodes of an output layer. The dimension to which $C_s$ belongs is uniformly divided into M groups, the dimension of each group is $[C_s/M]$ (if the dimensions are insufficient, then a zero padding is performed in the last group), so the parameter of fully connected layers may be divided into M groups in this way, each group comprising $C_t$ second parameter sub-vectors.

In the divided M groups of second parameter sub-vectors, a K-means clustering is performed to acquire a corresponding second subcode book of each group, where, K is a positive integer, and K is a number of second code words in a second subcode book.

Further, the deep convolutional neural network is of the plurality of convolutional layers, an output feature map of the deep convolutional neural network is acquired according to the plurality of subcode books and respective corresponding index values of the plurality of subcode books by repeatedly executing the following processes until the plurality of convolutional layers have all been traversed:

inputting a first feature map;

dividing the first feature map into M groups, each of the groups comprising a plurality of first feature sub-vectors;

performing an inner product operation between the plurality of first feature sub-vectors and the plurality of first code words in a corresponding first subcode book of each group respectively to obtain a plurality of first operation results, and storing the plurality of first operation results in a first lookup table;

summing the plurality of first operation results to obtain an output first feature map.

Herein, first feature map is input, the first feature map may be, but not limited to, in particular a 3-dimensional array of $W_s \times H_s \times C_s$, where, $W_s$ is a width of the input feature map, $H_s$ is a height of the input feature map. The dimension to which $C_s$ belongs is uniformly divided into M groups, the dimension of each group is $[C_s/M]$ (if the dimensions are insufficient, then a zero padding is performed in the last group), so the first feature map of convolutional layers may be divided into M groups in this way, each group comprising $W_s \times H_s$ first feature sub-vectors.

For a convolutional layer, a response value of a certain node in an output first feature map is a summation of inner products between a vector constituted of response values of all nodes in each location inside a corresponding spatial region in the input first feature map and a vector constituted of all connection weights on each location in a corresponding convolution kernel, according to formula (1):

$$G(c_t, w_t, h_t) = \Sigma_{W_k, h_k} \langle \text{vec}(W_{c_t, w_k, h_k}), \text{vec}(F_{w_s, h_s}) \rangle \quad (1)$$

where, G is an output first feature map, of which $G(c_t, w_t, h_t)$ a is a node with a spatial location of $(w_t, h_t)$ on the $C_t$th first feature map, W is a convolution kernel, $(W_{c_t}, w_k, h_k)$ is the $C_t$th convolution kernel of the convolution kernel, corresponding to a parameter vector with a spatial location of $(w_k, h_k)$ in the $C_t$th first feature map of the output first feature maps G, F is the input first feature map, $(F_{w_s}, h_s)$ represents a feature vector with a spatial location of $(w_s, h_s)$.

These inner products may be split into a summation of inner products of a plurality of sub-vectors, i.e., an inner product operation between a plurality of first feature sub-vectors and a plurality of first code words in a corresponding first subcode book of each group is performed to obtain a plurality of first operation results, the plurality of the first operation results are summed to obtain the output first feature map, particularly according to formula (2): and the plurality of first operation results are stored in a first lookup table, where the size of the first lookup table is $W_s \times H_s \times M \times K$.

$$G(c_t, w_t, h_t) = \Sigma_{w_k, h_k, m} \langle \text{vec}(W_{c_t, w_k, h_k}^{(m)}), \text{vec}(F_{w_s, h_s}^{(m)}) \rangle$$
$$\approx \Sigma_{w_k, h_k, m} \langle \text{vec}(C^{(m)}(k_{c_t, w_k, h_k}^{(m)})), \text{vec}(F_{w_s, h_s}^{(m)}) \rangle \quad (2)$$

where, $W_{c_t,w_k,h_k}^{(m)}$ the is a m th sub-vector in a first parameter sub-vectors $W_{c_t,w_k,h_k}$, $F_{w_s,h_s}^{(m)}$ is a m th sub-vector in a first feature sub-vectors $F_{w_s,h_s}$; $C^{(m)}$ is a m th first subcode book, $k_{c_t,w_k,h_k}^{(m)}$ is a quantized index value of the first parameter sub-vector $W_{c_t,w_k,h_k}^{(m)}$, $C^{(m)}$ is a first code word used when the first parameter sub-vector $W_{c_t,w_k,h_k}^{(m)}$ is quantized.

Further, the deep convolutional neural network is of the plurality of fully connected layers, the output feature map of the deep convolutional neural network is quantized according to the plurality of subcode books and respective corresponding index values of the plurality of subcode books by repeatedly executing the following processes until the plurality of fully connected layers have all been traversed:

inputting a second feature map;

dividing the second feature map into M groups, each of the groups comprising a second feature sub-vector;

performing an inner product operation between the second feature sub-vector and the plurality of second code words in a corresponding second subcode book of each group to obtain a plurality of second operation results, and storing the plurality of second operation results in a second lookup table;

summing the plurality of second operation results to obtain an output second feature map.

Herein, the second feature map is input, the second feature map may be, but not limited to, in particular a column vector of $C_s \times 1$. The dimension to which $C_s$ belongs is uniformly divided into M groups, the dimension of each group is $[C_s/M]$ (if the dimensions are insufficient, then a zero padding is performed in the last section), so the second feature map of a fully connected layer may be divided into M groups in this way, each group comprising 1 second parameter sub-vector.

In the divided M groups of feature sub-vectors, the inner products between each feature sub-vector and all code words in a corresponding subcode book are calculated respectively, and stored in one lookup table. For fully connected layers, the size of the lookup table is M×K.

For fully connected layers, a response value of a certain node in a second feature map is an inner product of vectors constituted of response values of all nodes in a second feature map and vectors constituted of corresponding connection weights, particularly according to formula (3):

$$G(c_t) = <\text{vec}(W_{c_t}), \text{vec}(F)> \quad (3)$$

where, G is the output second feature map, $G(c_t)$ being is a $c_t$th node, W is a connection weight matrix, $W_{c_t}$ being is a $c_t$th row in the matrix (corresponding to the $c_t$th node in the output feature map), i.e., a second parameter sub-vector, F is the second feature map, i.e., a feature vector.

This inner product may be split into a summation of inner products of a plurality of sub-vectors, i.e., an inner product operation between the second feature sub-vector and the plurality of second code words in a corresponding second subcode book of each group is performed to obtain a plurality of second operation results, and the plurality of second operation results are stored in a second lookup table; the plurality of second operation results are summed to obtain the output second feature map, particularly according to formula (4):

$$G(c_t) = \Sigma_m <\text{vec}(W_{c_t}^{(m)}), \text{vec}(F^{(m)})> \approx \Sigma_m <\text{vec}(C^m(k_{c_t}^m)), \text{vec}(F^{(m)})> \quad (4)$$

where, $W_{c_t}^{(m)}$ is a m th second parameter sub-vector in a second parameter sub-vectors $W_{c_t}$, $F^{(m)}$ is a mth second feature sub-vector in a second feature sub-vectors F, is a mth second subcode book, is a quantized index value of the second parameter sub-vector $W_{c_t}^{(m)}$, $C^m(k_{c_t}^m)$ is a second code word used when the second parameter sub-vector $W_{c_t}^{(m)}$ is quantized.

For convolutional layers and fully connected layers, in the approximated calculation processes, in accordance with the quantized index values of parameter sub-vectors, the corresponding inner product is obtained directly from the lookup table, and there is no need to repeatedly calculate the inner product, thus the operational overhead may be significantly reduced, and the operation speed is improved.

The description above is merely particular embodiments of the application, however, the scope of protection of the application is not limited to this, any changes or alternations that may be easily figured out by one of ordinary skill in the art, within the disclosed technical scope of the application, should be encompassed in the scope of protection of the application. Therefore, the scope of protection of the application is subject to the scope of protection of the appendant claims.

What is claimed is:

1. An acceleration and compression method for a deep convolutional neural network based on quantization of a parameter, comprising:

quantizing the parameter of the deep convolutional neural network to obtain a plurality of subcode books and respective corresponding index values of the plurality of subcode books;

acquiring an output feature map of the deep convolutional neural network according to the plurality of subcode books and respective corresponding index values of the plurality of subcode books;

the deep convolutional neural network comprises a plurality of convolutional layers, the quantizing a parameter of the deep convolutional neural network to obtain a plurality of subcode books and respective corresponding index values of the plurality of books comprises:

repeatedly executing the following processes until the plurality of convolutional layers have all been traversed:

dividing a parameter of the convolutional layers into M groups, each group comprising a plurality of first parameter sub-vectors, wherein, M is a positive integer;

performing a K-means clustering for the plurality of first parameter sub-vectors of each group to obtain a corresponding first subcode book of each group, the first subcode book comprising a plurality of first code words;

calculating Euclidean distances between the plurality of first parameter sub-vectors and the plurality of first code words, respectively;

acquiring a first parameter sub-vector and a first code word with a minimum of the Euclidean distances, and recording an index value of the first code word with the minimum of Euclidean distances;

the deep convolutional neural network comprises a plurality of fully connected layers, the quantizing a parameter of the deep convolutional neural network to obtain a plurality of subcode books and respective corresponding index values of the plurality of subcode books comprises:

repeatedly executing the following processes until the plurality of fully connected layers have all been traversed:

dividing a parameter of the fully connected layers into M groups, each group comprising a plurality of second parameter sub-vectors;

performing a K-means clustering for the plurality of second parameter sub-vectors respectively to obtain a corresponding second subcode book of each of the groups, the second subcode book comprising a plurality of second code words;

calculating Euclidean distances between the plurality of second parameter sub-vectors and the plurality of second code words, respectively;

acquiring a second parameter sub-vector and a second code word with a minimum of the Euclidean distances, and recording an index value of the second code word with the minimum of Euclidean distances;

the deep convolutional neural network comprises the plurality of convolutional layers, the acquiring an output feature map of the deep convolutional neural network according to the plurality of subcode books and respective corresponding index values of the plurality of subcode books comprises:

repeatedly executing the following processes until the plurality of convolutional layers have all been traversed:

inputting a first feature map;

dividing the first feature map into M groups, each of the groups comprising a plurality of first feature sub-vectors;

performing inner product operations between the plurality of first feature sub-vectors and the plurality of first code words in a corresponding first subcode book of each group respectively to obtain a plurality of first operation results, and storing the plurality of the first operation results in a first lookup table;

summing the plurality of first operation results to obtain an output first feature map.

2. The method according to claim 1, wherein, the deep convolutional neural network comprises the plurality of fully connected layers, the acquiring an output feature map of the deep convolutional neural network according to the plurality of subcode books and the respective corresponding index values of the plurality of subcode books comprises:

repeatedly executing the following processes until the plurality of fully connected layers have all been traversed:

inputting a second feature map;

dividing the second feature map into M groups, each of the groups comprising a second feature sub-vector;

performing inner product operations between the second feature sub-vector and the plurality of second code words in a corresponding second subcode book of each group to obtain a plurality of second operation results, and storing the plurality of second operation results in a second lookup table;

summing the plurality of second operation results to obtain an output second feature map.

* * * * *